US010428749B2

United States Patent
Kraemer et al.

(10) Patent No.: US 10,428,749 B2
(45) Date of Patent: Oct. 1, 2019

(54) EXHAUST-GAS-TURBOCHARGED INTERNAL COMBUSTION ENGINE WITH PARTIAL DEACTIVATION

(71) Applicant: Ford Global Technologies, LLC, Dearborn, MI (US)

(72) Inventors: Frank Kraemer, Neunkirchen-Seelscheid (DE); Vanco Smiljanovski, Bedburg (DE); Franz J. Brinkmann, Huerth-Efferen (DE); Helmut Matthias Kindl, Aachen (DE); Franz Arnd Sommerhoff, Aachen (DE); Hanno Friederichs, Aachen (DE); Joerg Kemmerling, Monschau (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/446,920

(22) Filed: Mar. 1, 2017

(65) Prior Publication Data

US 2017/0260916 A1    Sep. 14, 2017

(30) Foreign Application Priority Data

Mar. 9, 2016  (DE) .................. 10 2016 203 823

(51) Int. Cl.
*F02D 41/00* (2006.01)
*F02B 37/00* (2006.01)
(Continued)

(52) U.S. Cl.
CPC .......... *F02D 41/0007* (2013.01); *F02B 29/04* (2013.01); *F02B 37/001* (2013.01);
(Continued)

(58) Field of Classification Search
CPC ............ F02B 37/18–186; F02B 37/001; F02B 37/007; F02B 37/10
(Continued)

(56) References Cited

U.S. PATENT DOCUMENTS 5,105,624 A * 4/1992 Kawamura ........... F02B 37/013
                                                    60/608
6,715,289 B2   4/2004 Mader et al.
(Continued)

FOREIGN PATENT DOCUMENTS

DE    102004035323 A1    2/2006
DE    202014105279 U1    11/2014
(Continued)

OTHER PUBLICATIONS

Machine generated translation for JP 2005-054771 A.*
(Continued)

*Primary Examiner* — Ngoc T Nguyen
(74) *Attorney, Agent, or Firm* — Geoffrey Brumbaugh; McCoy Russell LLP (57) ABSTRACT

Embodiments for operating an engine having parallel turbochargers and two fluidically coupleable, separated intake manifolds is provided. In one example, a method includes responsive to a first condition, operating a first cylinder group of an engine, deactivating a second cylinder group of the engine, and blocking fluidic communication between a first intake manifold coupled to the first cylinder group and a second intake manifold coupled to the second cylinder group, and responsive to a second condition, activating the second cylinder group and establishing fluidic communication between the first and second intake manifolds.

17 Claims, 3 Drawing Sheets

(51) Int. Cl.

| | | |
|---|---|---|
| *F02B 37/10* | (2006.01) | |
| *F02B 37/18* | (2006.01) | |
| *F02B 29/04* | (2006.01) | |
| *F02B 75/20* | (2006.01) | |
| *F02M 35/10* | (2006.01) | |
| *F02B 37/007* | (2006.01) | |
| *F02D 13/06* | (2006.01) | |
| *F02D 17/02* | (2006.01) | |
| *F02D 23/00* | (2006.01) | |
| *F02B 75/18* | (2006.01) | |
| *F01N 13/10* | (2010.01) | |

(52) U.S. Cl.
CPC .......... *F02B 37/002* (2013.01); *F02B 37/007* (2013.01); *F02B 37/10* (2013.01); *F02B 37/183* (2013.01); *F02B 75/20* (2013.01); *F02D 13/06* (2013.01); *F02D 17/02* (2013.01); *F02D 23/00* (2013.01); *F02D 41/0082* (2013.01); *F02D 41/0087* (2013.01); *F02M 35/10045* (2013.01); *F02M 35/10065* (2013.01); *F02M 35/10144* (2013.01); *F02M 35/10255* (2013.01); *F01N 13/107* (2013.01); *F02B 2075/1816* (2013.01); *Y02T 10/144* (2013.01); *Y02T 10/146* (2013.01); *Y02T 10/18* (2013.01)

(58) Field of Classification Search
USPC ........................................ 60/602, 612, 605.1
See application file for complete search history.

(56) References Cited

U.S. PATENT DOCUMENTS

| | | |
|---|---|---|
| 8,607,544 B2 | 12/2013 | Uhrich et al. |
| 8,919,097 B2 | 12/2014 | Kerns et al. |
| 2003/0188535 A1* | 10/2003 | Mader ................... F02B 37/007 60/612 |
| 2006/0070382 A1* | 4/2006 | Karlsson ............... F02B 37/001 60/612 |
| 2007/0074513 A1 | 4/2007 | Lamb et al. |
| 2011/0265454 A1* | 11/2011 | Smith ................... F01N 3/0842 60/274 |
| 2013/0167528 A1* | 7/2013 | Schlund ................. F02M 25/07 60/612 |
| 2014/0163839 A1 | 6/2014 | Staley et al. |
| 2014/0174074 A1* | 6/2014 | Hilditch .................. F02B 37/12 60/602 |
| 2014/0352300 A1 | 12/2014 | Keating |
| 2015/0000269 A1 | 1/2015 | Zhuge et al. |
| 2016/0290287 A1* | 10/2016 | Foege ................... F02M 26/08 |

FOREIGN PATENT DOCUMENTS

| | | | | |
|---|---|---|---|---|
| JP | 04054218 A | * | 2/1992 | .............. F01N 5/04 |
| JP | 2005054771 A | * | 3/2005 | .......... F02B 29/0412 |
| JP | 2006250002 A | | 9/2006 | |

OTHER PUBLICATIONS

DeMorro, Christopher, "Audi's Cylinder-Deactivation Tech Claims 20% Fuel Savings," Nov. 13, 2013, GAS2: Green is the New Gas, Accessed Mar. 29, 2017, 2 pages.

Read, Tom, et al., "Cadillac Next-Gen V-6 Engines Led by 3.0L Twin Turbo," Cadillac Pressroom, Mar. 20, 2015, Accessed Mar. 29, 2017, 4 pages.

\* cited by examiner

EXHAUST-GAS-TURBOCHARGED INTERNAL COMBUSTION ENGINE WITH PARTIAL DEACTIVATION

CROSS REFERENCE TO RELATED APPLICATIONS

This application claims priority to German Patent Application No. 102016203823.0, filed on Mar. 9, 2016. The entire contents of the above-referenced application are hereby incorporated by reference in its entirety for all purposes.

FIELD

The disclosure relates to a supercharged internal combustion engine having at least two cylinders.

BACKGROUND AND SUMMARY

Internal combustion engines may be supercharged. Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible, given the same vehicle boundary conditions, to shift the load collective toward higher loads, at which the specific fuel consumption is lower.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least two cylinders. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical supercharger is that an exhaust-gas turbocharger utilizes the exhaust-gas energy of the hot exhaust gases, whereas a mechanical supercharger commonly draws the energy required for driving it directly or indirectly from the internal combustion engine, and thus reduces the efficiency. In some cases, a mechanical or kinematic connection is required for the transmission of power between the supercharger and the internal combustion engine.

The advantage of a mechanical supercharger in relation to an exhaust-gas turbocharger is that the mechanical supercharger generates, and makes available, the required charge pressure at all times, specifically regardless of the operating state of the internal combustion engine, in particular regardless of the present rotational speed of the crankshaft. This applies in particular to a mechanical supercharger which can be driven by way of an electric machine.

However, difficulties may be encountered in achieving an increase in power in all engine speed ranges by means of exhaust-gas turbocharging. A relatively severe torque drop is observed in the event of a certain engine speed being undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a torque drop.

One measure to improve the torque characteristic of a supercharged internal combustion engine, for example, is a small design of the turbine cross section and simultaneous provision of an exhaust-gas blow-off facility. Such a turbine is also referred to as a wastegate turbine. If the exhaust-gas mass flow exceeds a critical value, a part of the exhaust-gas flow is, within the course of the so-called exhaust-gas blow-off, conducted via a bypass line past the turbine. This approach has the disadvantage that the supercharging behavior is inadequate at relatively high rotational speeds or in the presence of relatively high exhaust-gas flow rates.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

The torque characteristic of a supercharged internal combustion engine may furthermore be improved by means of multiple turbochargers arranged in parallel, that is to say by means of multiple turbines of relatively small turbine cross section arranged in parallel, wherein turbines are activated successively with increasing exhaust-gas flow rate.

In the development of internal combustion engines, it is a basic aim to minimize fuel consumption, wherein the emphasis in the efforts being made is on obtaining an improved overall efficiency. Further measures are utilized aside from the supercharging of the internal combustion engine.

Fuel consumption and thus efficiency pose a problem in particular in the case of Otto-cycle engines, that is to say in the case of applied-ignition internal combustion engines. The reason for this lies in the fundamental operating process of the Otto-cycle engine. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it is possible in this way for the air mass, that is to say the quantity, to be set by means of the pressure of the inducted air. This also explains why quantity regulation has proven to be disadvantageous specifically in part-load operation, because low loads demand a high degree of throttling and a large pressure reduction in the intake system, as a result of which the charge exchange losses increase with decreasing load and increasing throttling.

To reduce the described losses, various strategies for dethrottling an Otto-cycle engine have been developed. One approach to a solution for dethrottling the Otto-cycle engine is for example an Otto-cycle engine operating process with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system.

Another option for optimizing the combustion process of an Otto-cycle engine includes an at least partially variable valve drive. By contrast to conventional valve drives, in which both the lift of the valves and the control timing are invariable, these parameters which have an influence on the combustion process, and thus on fuel consumption, can be varied to a greater or lesser extent by means of variable valve drives. If the closing time of the inlet valve and the inlet valve lift can be varied, this alone makes throttling-free and thus loss-free load control possible. The mixture mass or charge air mass which flows into the combustion chamber during the intake process is then controlled not by means of a throttle flap but rather by means of the inlet valve lift and the opening duration of the inlet valve. Variable valve drives are however very expensive and are therefore often unsuitable for series production.

A further approach to a solution for de-throttling an Otto-cycle engine is offered by cylinder deactivation, that is to say the deactivation of individual cylinders in certain load ranges. The efficiency of the Otto-cycle engine in part-load operation can be improved, that is to say increased, by means of such partial deactivation because the deactivation of one cylinder of a multi-cylinder internal combustion engine increases the load on the other cylinders, which remain operational, if the engine power remains constant, such that the throttle flap may be opened further in order to introduce a greater air mass into said cylinders, whereby de-throttling of the internal combustion engine is attained overall. During the partial deactivation, the cylinders which are permanently operational operate in the region of higher loads, at which the specific fuel consumption is lower. The load collective is shifted toward higher loads.

The cylinders which remain operational during the partial deactivation furthermore exhibit improved mixture formation owing to the greater air mass or mixture mass supplied.

Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, exhibit greater efficiency, that is to say lower fuel consumption, than Otto-cycle engines in which the load—as described above—is adjusted by means of throttling or quantity regulation with regard to the charge of the cylinders, there is, even in the case of diesel engines, potential for improvement and a demand for improvement with regard to fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be improved, that is to say increased, by means of a partial deactivation, because, even in the case of the diesel engine, in the case of constant engine power the deactivation of at least one cylinder of a multi-cylinder internal combustion engine increases the load on the other cylinders that are still operational, such that said cylinders operate in regions of higher loads, in which the specific fuel consumption is lower. The load collective in part-load operation of the diesel engine is shifted toward higher loads.

With regard to the wall heat losses, the same advantages are attained as in the case of the Otto-cycle engine, for which reason reference is made to the corresponding statements given.

In the case of diesel engines, the partial deactivation is also intended to prevent the fuel-air mixture from becoming too lean in the context of the quality regulation in the presence of decreasing load as a result of a reduction of the fuel quantity used.

However, the inventors herein have recognized that multi-cylinder internal combustion engines with partial deactivation and the associated methods for operating said internal combustion engines suffer from various issues, as will be explained briefly below.

If, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated by the deactivated cylinders lessen, and counteract, the improvements achieved with regard to fuel consumption and efficiency by means of the partial deactivation, such that the benefit of the partial deactivation is at least partially lost, that is to say the partial deactivation in fact yields an altogether less pronounced improvement.

In practice, it is not always expedient for the above-described disadvantageous effects to be remedied through the provision of switchable valve drives, because switchable valve drives such as variable valve drives are very expensive and exhibit only limited suitability for series production.

Furthermore, in the case of internal combustion engines supercharged by exhaust-gas turbocharging, switchable valve drives would lead to further problems because the turbine of an exhaust-gas turbocharger is configured for a certain exhaust-gas flow rate, and thus generally also for a certain number of cylinders. If the valve drive of a deactivated cylinder is deactivated, the overall mass flow through the cylinders of the internal combustion engine is initially reduced owing to the omission of the mass flow through the deactivated cylinders. The exhaust-gas mass flow conducted through the turbine decreases, and the turbine pressure ratio generally also decreases as a result. This has the effect that the charge pressure ratio likewise decreases, that is to say the charge pressure falls, and only a small amount of fresh air or charge air is or can be supplied to the cylinders that remain operational. The small charge-air flow may also have the effect that the compressor operates beyond the surge limit.

It would however in fact be necessary for the charge pressure to be increased in order to supply more charge air to the cylinders that remain operational, because in the event of deactivation of at least one cylinder of a multi-cylinder internal combustion engine, the load on the other cylinders, which remain operational, increases, for which reason a greater amount of charge air and a greater amount of fuel is supplied to said cylinders. The drive power available at the compressor for generating an adequately high charge pressure is dependent on the exhaust-gas enthalpy of the hot exhaust gases, which is determined significantly by the exhaust-gas pressure and the exhaust-gas temperature, and the exhaust-gas mass or the exhaust-gas flow.

In the case of Otto-cycle engines, by opening the throttle flap, the charge pressure can be easily increased in the load range relevant for partial deactivation. This possibility does not exist in the case of the diesel engine. The small charge-air flow may have the effect that the compressor operates beyond the surge limit.

The effects described above lead to a restriction of the practicability of the partial deactivation, specifically to a restriction of the engine speed range and of the load range in which the partial deactivation can be used. In the case of low charge-air flow rates, it is not possible, owing to inadequate compressor power or turbine power, for the charge pressure to be increased in accordance with demand.

The charge pressure during partial deactivation, and thus the charge-air flow rate supplied to the cylinders that remain operational, could for example be increased by a small configuration of the turbine cross section and by simultaneous exhaust-gas blow-off, whereby the load range relevant for a partial deactivation would also be expanded again. This approach however has the disadvantage that the supercharging behavior is inadequate when all the cylinders are operated.

The charge pressure during partial deactivation, and thus the charge-air flow rate supplied to the cylinders that are still operational, could also be increased by virtue of the turbine being equipped with a variable turbine geometry, which permits an adaptation of the effective turbine cross section to the present exhaust-gas mass flow. The exhaust-gas back pressure in the exhaust-gas discharge system upstream of the turbine would then however simultaneously increase, leading in turn to higher charge-exchange losses in the cylinders that are still operational.

Thus, the inventors herein provide a system to at least partly address the above issues. In one example, a system includes a supercharged internal combustion engine having at least two cylinders arranged into a first group and a second group, each cylinder having at least one outlet opening adjoined by a respective exhaust line for discharging exhaust gases via an exhaust-gas discharge system and at least one inlet opening adjoined by a respective intake line for supply of charge air via an intake system. Each cylinder of the first group is configured to be operational even during partial deactivation of the internal combustion engine, and each cylinder of the second group is configured to be a load-dependently switchable cylinder. Each exhaust line of each cylinder of the first group merges to form a first overall exhaust line, thus forming a first exhaust manifold, and each exhaust line of each cylinder of the second group merges to form a second overall exhaust line, thus forming a second exhaust manifold. Each intake line of each cylinder of the first group merges to form a first overall intake line, thus forming a first intake manifold, and each intake line of each cylinder of the second group merging to form a second overall intake line, thus forming a second intake manifold. The system further includes a first exhaust-gas turbocharger having a first turbine arranged in the exhaust-gas discharge system and a first compressor arranged in the intake system, the first turbine and first compressor being arranged in on a first rotatable shaft, and a second exhaust-gas turbocharger having a second turbine arranged in the exhaust-gas discharge system and a second compressor arranged in the intake system, the second turbine and second compressor being arranged in on a second rotatable shaft. The first turbine is arranged in the first overall exhaust line of the first cylinder group and the second turbine arranged in the second overall exhaust line of the second cylinder group, and the first compressor is arranged in the first overall intake line of the first cylinder group and the second compressor arranged in the second overall intake line of the second cylinder group, the first and second compressor arranged in parallel. The first intake manifold of the first cylinder group and the second intake manifold of the second cylinder group are connectable to one another via a connection, a first shut-off element being arranged in the connection.

The internal combustion engine according to the disclosure is equipped with at least two exhaust-gas turbochargers and consequently with more than one turbine in the exhaust-gas discharge system. The turbines of the at least two exhaust-gas turbochargers are arranged in parallel in the exhaust-gas discharge system, with each cylinder group being assigned a turbine. This yields a considerable improvement in supercharging behavior, that is to say in the torque characteristic of the internal combustion engine, in particular during partial deactivation.

Each turbine may be configured for the exhaust-gas flow rate of the associated cylinder group, that is to say for the number of cylinders of the respective group. Then, if the deactivatable cylinder(s) of the second group is deactivated, this no longer necessarily has an influence on the exhaust-gas flow rate conducted through the turbine of the first group, as a result of which the turbine pressure ratio of said first turbine does not necessarily decrease. The charge pressure ratio does not decrease, and sufficient charge air is supplied to the cylinders that remain operational.

According to the disclosure, it is specifically the case that the compressors of the at least two exhaust-gas turbochargers are likewise arranged in parallel in the intake system, with each cylinder group being assigned a compressor. The compressor of the first exhaust-gas turbocharger is arranged in the first overall intake line of the first cylinder group, and is thus assigned to the first cylinder group. The compressor of the second exhaust-gas turbocharger is arranged in the second overall intake line of the second cylinder group, and is thus assigned to the second cylinder group. Consequently, the compressor of the second exhaust-gas turbocharger (also referred to as the second compressor), may be deactivated, for example separated from the rest of the intake system by way of a shut-off element, during the partial deactivation owing to the absence of demand. The associated second turbine is in any case not supplied with exhaust gas. The supply of charge air to the deactivated cylinders is preferably stopped.

According to the disclosure, the intake systems of the cylinder groups are connectable via a connection, the first intake manifold of the first cylinder group and the second intake manifold of the second cylinder group being connectable to one another via the connection, and a first shut-off element being arranged in the connection. In the context of the present disclosure, the intake manifold comprises in each case the intake lines of the associated cylinder group, that part of the associated overall intake line which leads as far as the compressor arranged in the overall intake line, and in some cases a plenum provided in between.

The physical feature whereby the first intake manifold and the second intake manifold are connectable to one another via the connection, but can be separated from one another by virtue of the first shut-off element arranged in the connection being closed, opens up numerous advantageous possibilities for the operation of the internal combustion engine.

During the partial deactivation, in the case of which the at least one switchable cylinder of the second group is deactivated, the first shut-off element may be closed. Then, the compressor of the first exhaust-gas turbocharger (also referred to as the first compressor), supplies charge air only to those cylinders of the first group which are operational even during partial deactivation, with the intake system of the second cylinder group being separated from the intake system of the first cylinder group. Then, the first compressor does not deliver charge air to the deactivated cylinders of the second group, nor does it deliver charge air into the compressor of the second exhaust-gas turbocharger, which is preferably deactivated during partial deactivation. Both would be disadvantageous, and therefore also undesirable.

With increasing load, it is then firstly possible for the first shut-off element to be opened, and the deactivated cylinders of the second group may be activated, such that the first compressor supplies charge air to all of the cylinders before the compressor of the second exhaust-gas turbocharger is activated in order to ensure or assist the provision of demanded charge pressure in the presence of further increasing load.

This approach also has the advantage that the second turbine assigned to the second cylinder group is accelerated again already before the compressor of the second exhaust-gas turbocharger is activated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Variable displacement engine (VDE) (also referred to as cylinder deactivation (CD)) may be an effective mechanism to increase the efficiency of engines, mainly due to the reduction of the gas exchange losses. Downsizing of engine displacement is another mechanism for increasing the fuel efficiency of engines. This usually relies on charging technologies in order to keep or even enlarge rated power and increase low end torque of the downsized engines. Parallel-sequential boosting with two turbochargers may be used to deliver the requested torque and power output.

According to embodiments disclosed herein, VDE operation in a turbocharged engine system may be provided in an efficient manner by using two electrically driven turbochargers (E-Turbo) and an intake manifold which is divided into two segments to feed a first group of cylinders on one hand and a second group of cylinders on the other. Both manifold segments are connected via a connection including a first shut-off element, also referred to as a VDE flap. The first e-turbo feeds the first group of cylinders and the second e-turbo feeds the second group of cylinders. VDE operation is active once the VDE flap is closed. Due to separated exhaust lines to both turbines, the deactivated cylinders are completely closed, which avoids a filling of the deactivated cylinders with exhaust gas from the running cylinders. If the VDE flap is open, all four cylinders will be fed with air by the first e-turbo. A second shut-off element (also referred to as a compressor shut-off valve) and a third shut-off element (also referred to as a turbine shut-off valve) are closed as long as the second e-turbo is not in operation. For higher load and speed requests, all the shut-off elements (e.g., both the compressor and turbine shut-off valves and the VDE-flap) are open. During operation of the first e-turbo, the second e-turbo is at a complete stand still. Once operation of the second e-turbo is requested, the second e-turbo is able to nearly-spontaneously speed up due to the electric motor and hence feed air into all cylinders.

If the first intake manifold and the second intake manifold are separated from one another by virtue of the first shut-off element arranged in the connection being closed, but all of the cylinders of the internal combustion engine are operational, each compressor supplies charge air to the cylinder group assigned thereto.

By contrast to the provision of a single exhaust-gas turbocharger, in which a single, relatively large turbine is arranged in the exhaust-gas discharge system, the turbines according to the disclosure of the at least two exhaust-gas turbochargers are of relatively small dimensions, because each turbine is assigned not to all of the cylinders but only to the cylinders of one group. The relatively small rotor of such a relatively small turbine results in lower inertia, whereby, in particular, the response behavior of the associated exhaust-gas turbocharger, and ultimately of the internal combustion engine, is improved. This offers advantages in particular if the turbine assigned to the second cylinder group has to be accelerated again after the partial deactivation comes to an end.

The internal combustion engine according to the disclosure has at least two cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. It is then the case that the exhaust lines of the cylinders merge to form three overall exhaust lines, thus forming three exhaust manifolds, wherein three exhaust-gas turbochargers are provided and a respective turbine of an exhaust-gas turbocharger is arranged in one overall exhaust line of one cylinder group.

Within the context of a partial deactivation, the three cylinder groups may be activated or deactivated in succession, whereby twofold switching may also be realized. The partial deactivation is thereby further optimized. The cylinder groups may also comprise a different number of cylinders, for example may form one group with one cylinder and one group with two cylinders in the case of a three-cylinder engine.

The embodiment of the internal combustion engine according to the disclosure leads to an expansion of the practicability of the partial deactivation, specifically to an expansion of the engine speed range and of the load range in which the partial deactivation can be used in the case of exhaust-gas-turbocharged internal combustion engines. Even during partial deactivation, it is possible, owing to an adequate compressor power or turbine power, for the charge pressure to be provided or increased in accordance with demand.

Embodiments of the supercharged internal combustion engine are provided in which a first auxiliary drive is provided which is at least connectable in terms of drive to the shaft of the first exhaust-gas turbocharger in order to additionally make power available for the drive of the compressor of the first exhaust-gas turbocharger and output said power to the compressor.

The auxiliary drive may be activated and operated when indicated, for example when the internal combustion engine is partially deactivated, that is to say the second cylinder group is deactivated.

Then, the charge pressure may be increased in order to supply more charge air to the cylinders of the first group that remain operational, because in the event of deactivation of the cylinders of the second group, the load on the other cylinders, which remain operational, of the multi-cylinder internal combustion engine increases, for which reason a greater amount of charge air and a greater amount of fuel are supplied to said cylinders. The drive power that is available at the first compressor for generating a charge pressure is duly, owing to the configuration according to the disclosure of the exhaust-gas discharge system, no longer reduced by a falling turbine pressure ratio during partial deactivation owing to a reduced exhaust-gas flow through the first turbine. This is however not sufficient. To increase the charge pressure, increased drive power is necessary in order to supply more charge air to those cylinders of the first group which remain operational.

Increasing the charge pressure downstream of the first compressor by the first auxiliary drive has advantages over other methods. For example, by way of an auxiliary drive, it is possible for the charge pressure to be influenced much more quickly than is possible by way of a turbine at the exhaust-gas side, for example by adjustment of a variable turbine geometry or of a wastegate. If the charge pressure is to be increased quickly, this can be effected more quickly by activation of the auxiliary drive than by increasing the exhaust-gas back pressure and/or reducing the blown-off exhaust-gas flow rate. A controller which acts on the exhaust-gas side in order to realize a change in the charge pressure on the intake side exhibits poorer response behavior, owing to the principles involved, than if the compressor power is increased directly by activation of the auxiliary drive.

The response behavior and therefore the operating behavior of the exhaust-gas turbocharging and thus of the internal combustion engine may be improved considerably by way of the option of it being possible to increase the power made available for the drive of the first compressor virtually without delay.

Embodiments of the supercharged internal combustion engine are provided in which a second auxiliary drive is provided which is at least connectable in terms of drive to the shaft of the second exhaust-gas turbocharger in order to additionally make power available for the drive of the compressor of the second exhaust-gas turbocharger and output said power to the compressor.

If the compressor of the second exhaust-gas turbocharger is activated, in particular after an end of the partial deactivation, it is generally sought for the rotational speed of the shaft of the second exhaust-gas turbocharger to be increased as quickly as possible, that is to say for the rotor both of the second turbine and of the compressor to be accelerated again quickly, in order that the second compressor can contribute to the generation of the charge pressure. The second auxiliary drive assists this.

If the first intake manifold and the second intake manifold are connected to one another by virtue of the first shut-off element arranged in the connection being opened, and all of the cylinders of the internal combustion engine are operational, both compressors supply charge air to all of the cylinders.

The first and the second auxiliary drive may basically also be utilized for improving the transient operating characteristics of the internal combustion engine.

If an auxiliary drive is provided, embodiments of the supercharged internal combustion engine may be provided in which the first auxiliary drive and/or the second auxiliary drive are/is a mechanically driven auxiliary drive.

If an auxiliary drive is provided, embodiments of the supercharged internal combustion engine may be provided in which the first auxiliary drive and/or the second auxiliary drive are/is an electrically driven electric machine. By contrast to a mechanically driven auxiliary drive, no mechanical or kinematic connection to the internal combustion engine is required. Furthermore, an electric machine may serve as an auxiliary drive and as a generator. The power received by the electric machine as generator can be stored and utilized, that is to say used, again when required for driving the electric machine which serves as auxiliary drive.

In this context, embodiments of the supercharged internal combustion engine are also provided in which the electric machine is operable as a generator in order to receive power from the associated turbine.

If the electric machine operated as a generator receives power from the turbine, this has the effect that the power made available by the turbine for driving the compressor is reduced, and the charge pressure downstream of the compressor is reduced.

According to the disclosure, the electric machine which can be drive-connected to the shaft of an exhaust-gas turbocharger does not have to be usable a priori as a generator, but rather has to be operable as an auxiliary drive. To this extent, the above embodiment is only one variant. An electric machine which can be operated merely as an auxiliary drive may be sufficient for carrying out the method according to the disclosure.

If the electric machine is utilized not as an electric auxiliary drive for the compressor but is used and operated as a generator in order to obtain or recover electrical energy, that is to say convert exhaust-gas energy into electrical energy, the energy that is released from the exhaust-gas flow to the turbine and ultimately to the shaft is not exclusively utilized for driving the compressor arranged on the shaft, but is at least partially received by the electric machine operated as a generator.

A blow-off of exhaust gas at the turbine side for the purposes of controlling or limiting the charge pressure downstream of the compressor may thus be dispensed with, for which reason the turbine of an exhaust-gas turbocharger does not have to be equipped with a bypass line, as a result of which the exhaust-gas turbocharging is simplified and is made more compact and less expensive.

The power made available by the turbine for the drive of the compressor is reduced by virtue of the fact that the electric machine which is operated as a generator receives power from the turbine. The charge pressure downstream of the compressor may be controlled, in particular reduced and limited, in this way by way of the power which is received by the electric machine.

With the exhaust-gas blow-off, not only the bypass line is dispensed with, but also the blow-off per se and thus the wasting of high-energy exhaust gas as a consequence of blow-off. The efficiency of the exhaust-gas turbocharging and of the internal combustion engine may be improved considerably by virtue of the fact that the excess power made available at the shaft by the turbine no longer has to be disposed of, that is to say dissipated, in an unutilized manner by blow-off but can be converted into electrical energy by way of the electric machine operated as a generator.

Controlling the charge pressure downstream of the compressor by way of the power received by the electric machine has further advantages. Thus, the charge pressure can be influenced substantially more rapidly by the electric machine than is possible by exhaust-gas blow-off. If the charge pressure is to be lowered rapidly, this can be brought about more rapidly by way of activation of the electric machine than by way of opening of a bypass line. A controller which acts on the exhaust-gas side in order to realize a change in the charge pressure on the intake side exhibits poorer response behavior, owing to the principles involved, than if the compressor power is reduced directly by activation of the electric machine.

The response behavior and therefore the operating behavior of the exhaust-gas turbocharging and thus of the internal combustion engine can be improved considerably by way of the option of it being possible to reduce the power provided for the drive of the compressor virtually without delay.

The above-described interdependencies are of significance both with regard to the limiting of the charge pressure and with regard to the rapid lowering of the charge pressure during a load change in the context of non-steady-state, that is to say transient, operation of the internal combustion engine.

In this context, embodiments of the supercharged internal combustion engine are provided in which a battery is provided in which the electrical energy obtained by way of the generator can be stored.

This variant has the advantage that the power obtained by generator operation does not have to be used immediately, but rather can be stored. In the case of an electric machine which can also be used and operated as an activatable auxiliary drive, the energy which is stored in the battery is preferably utilized for the drive of the auxiliary drive, without it being necessary for energy to be provided additionally, which could possibly increase the fuel consumption of the internal combustion engine.

Embodiments of the supercharged internal combustion engine are provided in which the first intake manifold is formed as a plenum, such that the first overall intake line opens into a first plenum from which the at least one intake line of the first cylinder group branches off. Likewise, the second intake manifold may be formed as a plenum, such that embodiments of the supercharged internal combustion engine are provided in which the second overall intake line opens into a second plenum from which the at least one intake line of the second cylinder group branches off.

A plenum serves as a voluminous collecting vessel for calming the charge air before it enters the cylinders. In this context, embodiments of the supercharged internal combustion engine are provided in which the first plenum of the first cylinder group and the second plenum of the second cylinder group are connectable to one another via a connection, wherein the first shut-off element is arranged in the connection.

Upon the ending of the partial deactivation, when, with increasing load, the deactivated cylinders of the second group are activated and the first shut-off element is initially opened, the first compressor supplies charge air to all of the cylinders, wherein the charge air flows via the first plenum and second plenum into the cylinders of the second group.

Embodiments of the supercharged internal combustion engine are provided in which the first shut-off element is a flap. Embodiments may be provided in which the flap is adjustable in continuously variable fashion. Then, not only a stoppage of the charge-air supply to the second cylinder group but also a targeted adjustment, that is to say metering, of the charge air originating from the first compressor and supplied to the—possibly deactivated—cylinders of the second group are possible.

Embodiments of the supercharged internal combustion engine are provided in which a second shut-off element is arranged in the second overall intake line between the compressor of the second exhaust-gas turbocharger and the connection.

As already mentioned, the second shut-off element serves for deactivating the second compressor, in particular during partial deactivation. When the second cylinder group is deactivated, said compressor is no longer driven by the associated second turbine. Here, the closure of said second shut-off element prevents not only a delivery of charge air to the cylinders by the second compressor but in particular also a delivery of charge air into the second compressor by the first compressor.

In this context, embodiments of the supercharged internal combustion engine may be provided in which a bypass line is provided which branches off from the second overall intake line upstream of the compressor of the second exhaust-gas turbocharger and opens into the second overall intake line downstream of the compressor of the second exhaust-gas turbocharger and/or opens into the first overall intake line downstream of the compressor of the first exhaust-gas turbocharger. In order that the second compressor does not, or does not have to, impart a delivery action in an undesired manner counter to the resistance of a closed second shut-off element during partial deactivation, a bypass line of the described type may be provided which, during partial deactivation, is opened and serves for the blow-off of charge air.

Embodiments of the supercharged internal combustion engine are therefore also provided in which a shut-off element is arranged in the bypass line.

Embodiments of the supercharged internal combustion engine are advantageous in which a third shut-off element is arranged in the second overall exhaust line. The third shut-off element is preferably arranged upstream of the second turbine in the second overall exhaust line or in the exhaust-gas discharge system. The closure of the third shut-off element during partial deactivation prevents exhaust gas that originates from the first cylinder group from being delivered into the second overall exhaust line or from passing into the cylinders of the second group.

Embodiments of the internal combustion engine are provided in which a shut-off element is a valve or a pivotable flap. The shut-off element may be electrically, hydraulically, pneumatically, mechanically, or magnetically controllable, preferably by an engine controller, such as the controller explained in more detail below.

Embodiments of the supercharged internal combustion engine are provided in which a first bypass line is provided which branches off from the exhaust-gas discharge system upstream of the turbine of the first exhaust-gas turbocharger and which opens into the exhaust-gas discharge system downstream of the turbine of the first exhaust-gas turbocharger, a shut-off element being arranged in the first bypass line.

Embodiments of the supercharged internal combustion engine are provided in which a second bypass line is provided which branches off from the exhaust-gas discharge system upstream of the turbine of the second exhaust-gas turbocharger and which opens into the exhaust-gas discharge system downstream of the turbine of the second exhaust-gas turbocharger, a shut-off element being arranged in the second bypass line.

The two embodiments above relate to the wastegate type of construction of the turbines of the exhaust-gas turbochargers, which may have advantages. The turbines of the exhaust-gas turbochargers may also be equipped with a variable turbine geometry. A variable turbine geometry permits a more detailed adaptation to the respective operating point of the internal combustion engine by way of adjustment of the turbine geometry or the effective turbine cross section, it also being possible for engine speed-dependent or load-dependent regulation of the turbine geometry to take place to a certain extent.

Here, guide blades for influencing the flow direction are arranged in the inlet region of the turbine. In contrast to the impeller blades of the rotating impeller, the guide blades do not rotate with the shaft of the turbine.

If the turbine has a fixed, invariable geometry, the guide blades, if present, are arranged in the inlet region so as to be not only stationary but rather also completely immovable, that is to say rigidly fixed. In contrast, if use is made of a turbine with variable geometry, the guide blades are arranged so as to be stationary but not so as to be completely immovable, rather so as to be rotatable about their axes, such that the flow approaching the impeller blades can be influenced.

Embodiments of the supercharged internal combustion engine are provided in which the overall exhaust lines of the at least two cylinder groups merge to form a common overall exhaust line downstream of the turbines. This embodiment yields advantages with regard to exhaust-gas aftertreatment, because a common exhaust-gas aftertreatment system can be provided in the common overall exhaust line for all of the exhaust gas.

Embodiments of the supercharged internal combustion engine are provided in which at least one exhaust-gas aftertreatment system, for example an oxidation catalytic converter, a three-way catalytic converter, a storage catalytic converter, a selective catalytic converter and/or a particle filter, is provided in the exhaust-gas discharge system.

Embodiments of the supercharged internal combustion engine are provided in which one or more charge-air coolers are arranged in the overall intake line downstream of the compressor of the first exhaust-gas turbocharger and/or downstream of the compressor of the second exhaust-gas turbocharger.

In the case of internal combustion engines having four cylinders in an in-line arrangement, embodiments are provided in which in each case one outer cylinder and one inner cylinder form a group, e.g., a first outer cylinder and first inner cylinder are in the first group and a second outer cylinder and second inner cylinder are in the second group.

In the case of internal combustion engines having four cylinders in an in-line arrangement, embodiments may also be provided in which the two outer cylinders and the two inner cylinders form in each case one group.

Embodiments of the supercharged internal combustion engine are provided in which at least one exhaust-gas recirculation arrangement is provided which comprises at least one line which branches off from the exhaust-gas discharge system and opens into the intake system.

Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. To achieve a significant reduction in nitrogen oxide emissions, high exhaust-gas recirculation rates are used.

Here, embodiments of the supercharged internal combustion engine are provided in which at least one valve for adjusting the recirculated exhaust-gas flow rate is arranged in the at least one line of the exhaust-gas recirculation arrangement.

Embodiments of the supercharged internal combustion engine are provided in which the at least one line of the exhaust-gas recirculation arrangement branches off from the exhaust-gas discharge system upstream of a turbine and opens into the intake system downstream of a compressor, also referred to as high-pressure EGR.

Embodiments of the supercharged internal combustion engine are likewise provided in which the at least one line of the exhaust-gas recirculation arrangement branches off from the exhaust-gas discharge system downstream of a turbine and opens into the intake system upstream of a compressor, also referred to as low-pressure EGR.

By contrast to high-pressure EGR, in the case of low-pressure EGR, exhaust gas which has already flowed through a turbine is introduced into the intake system. For this purpose, the low-pressure EGR arrangement has a recirculation line which branches off from the exhaust-gas discharge system downstream of a turbine and opens into the intake system upstream of a compressor.

Embodiments of the supercharged internal combustion engine are provided in which each cylinder is equipped with a direct-injection mechanism for the introduction of fuel. Here, embodiments are provided in which each cylinder is equipped with an injection nozzle for the purposes of direct injection.

The fuel supply can be deactivated more quickly and more reliably, for the purposes of the partial deactivation, in the case of direct-injection internal combustion engines than in the case of internal combustion engines with intake pipe injection, in which fuel residues in the intake pipe can lead to undesired combustions in the deactivated cylinder.

Nevertheless, embodiments of the internal combustion engine may be provided in which an intake pipe injection mechanism is provided for the purposes of supplying fuel.

Embodiments of the supercharged internal combustion engine are provided in which each cylinder is equipped with an ignition device, preferably an ignition plug, for initiating an applied ignition.

The disclosure further includes a method for operating a supercharged internal combustion engine of a type described above. The method may be distinguished by the fact that, proceeding from an internal combustion engine in a partially deactivated state in which the at least one switchable cylinder of the second group is deactivated and the first shut-off element is closed and the compressor of the second exhaust-gas turbocharger is deactivated, in the presence of increasing load and an exceedance of a first predefinable load $T_{up,1}$, the first shut-off element is opened, and the at least one deactivated cylinder of the second group is activated.

That which has already been stated with regard to the internal combustion engine according to the disclosure also applies to the method according to the disclosure, for which reason reference is generally made at this juncture to the statements made above with regard to the supercharged internal combustion engine. The different internal combustion engines may dictate, in part, different method variants.

In the case of a partially deactivated internal combustion engine, the deactivated cylinders of the second group are activated with increasing load. The first shut-off element is opened in order that the first compressor supplies, or can supply, charge air to all of the cylinders.

With further increasing load, the compressor of the second exhaust-gas turbocharger is then activated in order to ensure or assist the provision of the required or demanded charge pressure.

Therefore, proceeding from an internal combustion engine in which the cylinders of the at least two groups are activated and operational and the first shut-off element is open, method variants are also provided in which the compressor of the second exhaust-gas turbocharger is activated in the presence of increasing load and an exceedance of a second pre-definable load $T_{up,2}$.

The second turbine fluidically coupled to the second cylinder group and thus the shaft of the second exhaust-gas turbocharger are in this case accelerated already before the compressor of the second exhaust-gas turbocharger is activated.

For the operation of a supercharged internal combustion engine in which a second shut-off element is arranged in the second overall intake line between the compressor of the second exhaust-gas turbocharger and the connection, method variants are provided which are distinguished by the fact that the compressor of the second exhaust-gas turbocharger is activated by virtue of the second shut-off element being opened and is deactivated by virtue of the second shut-off element being closed.

Method variants are provided in which the fuel supply to the at least one switchable cylinder is deactivated during deactivation.

Method variants are provided in which the ignition in the at least one operational cylinder is realized by means of auto-ignition.

The above method variant relates to methods in which the combustion is initiated by means of auto-ignition, and thus also to operating processes such as are conventionally used in diesel engines.

It is also possible, for the operation of an Otto-cycle engine, to use a hybrid combustion process with auto-ignition, for example the so-called HCCI method, which is also referred to as the spatial ignition method or as the CAI method. Said method is based on a controlled auto-ignition of the fuel supplied to the cylinder. Owing to the low combustion temperatures, relatively low nitrogen oxide emissions are generated, with likewise virtually no soot emissions.

Embodiments of the method are provided in which the predefinable load $T_{up,1}$ and/or $T_{up,2}$ is dependent on the engine speed n of the internal combustion engine. Then, there is not only one specific load, upon the undershooting or exceedance of which switching takes place regardless of the engine speed n. Instead, an engine-speed-dependent approach is followed, and a region in the characteristic map is defined in which partial deactivation takes place.

It is basically possible for further operating parameters of the internal combustion engine, for example the engine temperature or the coolant temperature after a cold start of the internal combustion engine, to be used as a criterion for a partial deactivation.

Method variants are provided in which an ignition device provided for initiating an applied ignition is deactivated during deactivation of a switchable cylinder.

An internal combustion engine of the stated type is used as a motor vehicle drive unit. Within the context of the present disclosure, the expression "internal combustion engine" encompasses diesel engines and Otto-cycle engines but also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

Figure 1:
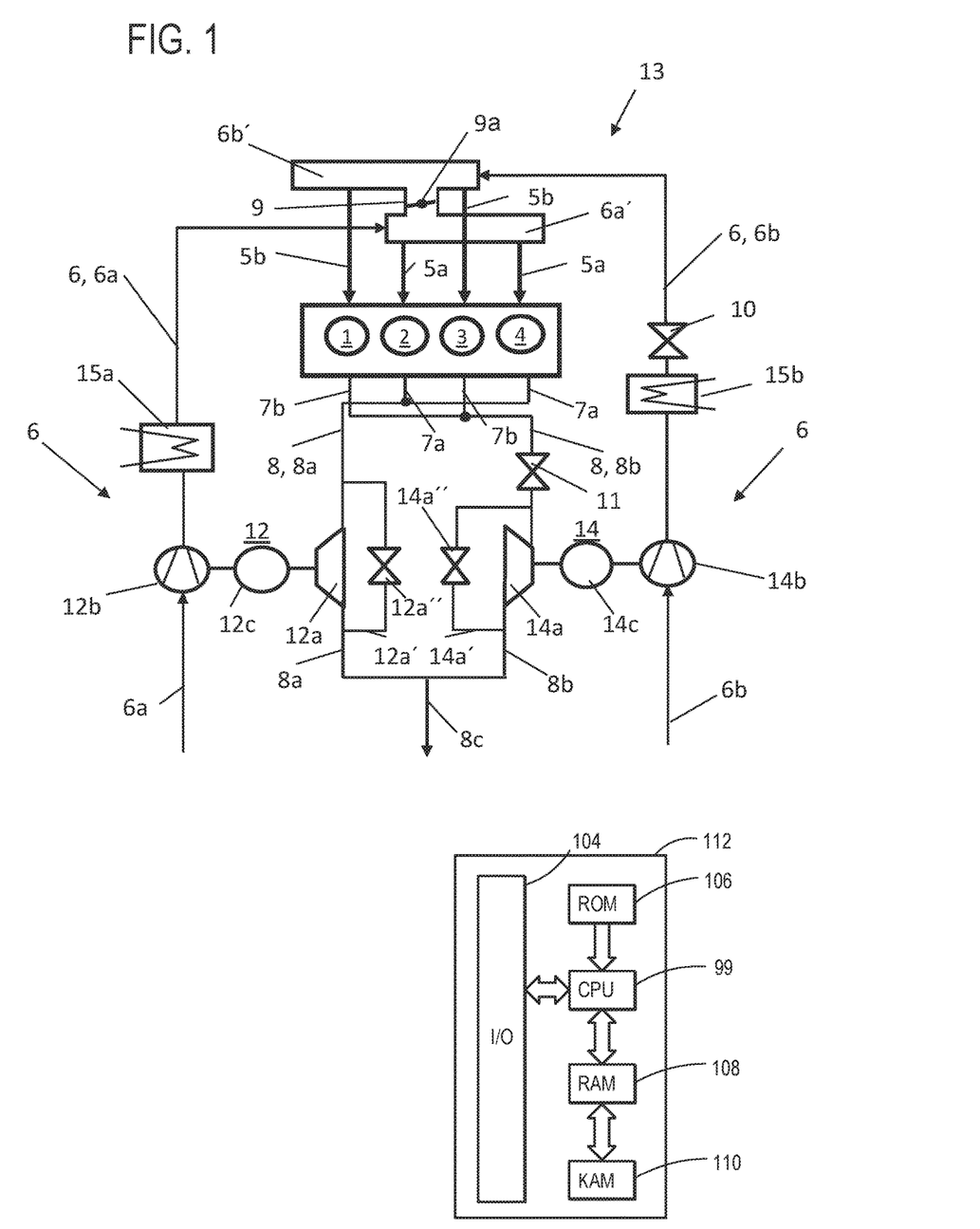
FIG. 1 schematically shows an embodiment of a supercharged internal combustion engine.

FIG. 1 schematically shows an embodiment of the supercharged internal combustion engine 13. Said internal combustion engine is a four-cylinder in-line engine 13 in which the four cylinders 1, 2, 3, 4 are arranged along the longitudinal axis of the cylinder head, that is to say in a line.

The four cylinders 1, 2, 3, 4 are configured and form two groups with in each case two cylinders, wherein the outer fourth cylinder 4 and the inner second cylinder 2 form a first group, the cylinders 4, 2 of which are operational even during partial deactivation of the internal combustion engine 13, and the outer first cylinder 1 and the inner third cylinder 3 form a second group, the cylinders 1, 3 of which are in the form of load-dependently switchable cylinders 1, 3 which are deactivated during a partial deactivation.

Each cylinder 1, 2, 3, 4 has an intake line (5a or 5b) for the supply of charge air via an intake system 6, and an exhaust line (7a or 7b) for the discharge of the exhaust gases via an exhaust-gas discharge system 8. As illustrated, the cylinders of the first group (cylinders 2, 4) are each coupled to a first intake line 5a and a first exhaust line 7a. The cylinders of the second group (cylinders 1, 3) are each coupled to a second intake line 5b and a second exhaust line 7b.

The first intake lines 5a of the two cylinders 2, 4 of the first group are fed with charge air from a first plenum 6a' into which a first overall intake line 6a of the intake system 6 opens.

The second intake lines 5b of the two switchable cylinders 1, 3 of the second group are fed with charge air from a second plenum 6b' into which a second overall intake line 6b of the intake system 6 opens.

Between the first plenum 6a' and the second plenum 6b' there is formed a connection 9 in which a first shut-off 9a is arranged, wherein a flap 9a serves as first shut-off element 9a. In this way, the first intake manifold of the first cylinder group and the second intake manifold of the second cylinder group are connectable to one another via the connection 9, but are also separable from one another by virtue of the flap 9a being closed. During partial deactivation of the internal combustion engine 13, the flap is preferably closed, and the connection 9 blocked.

The first exhaust lines 7a merge to form a first overall exhaust line 8a, thus forming a first exhaust manifold. The second exhaust lines 7b merge to form a second overall exhaust line 8b, thus forming a second exhaust manifold. Said overall exhaust lines 8a, 8b merge in turn to form a common overall exhaust line 8c, in which an exhaust-gas aftertreatment system is provided (not illustrated).

The internal combustion engine 13 is equipped with two exhaust-gas turbochargers 12, 14 for supercharging purposes, wherein each exhaust-gas turbocharger 12, 14 comprises a turbine 12a, 14a arranged in the exhaust-gas discharge system 8 and a compressor 12b, 14b arranged in the intake system 6.

The first turbine 12a of the first exhaust-gas turbocharger 12 is arranged in the first overall exhaust line 8a of the first cylinder group and the second turbine 14a of the second exhaust-gas turbocharger 14 is arranged in the second overall exhaust line 8b of the second cylinder group, wherein the two associated compressors (first compressor 12b, second compressor 14b) of the two exhaust-gas turbochargers 12, 14 are likewise arranged in parallel in the intake system 6.

As already mentioned, the intake system 6 comprises two overall intake lines 6a, 6b. The first compressor 12b of the first exhaust-gas turbocharger 12 is arranged in the first overall intake line 6a and the second compressor 14b of the second exhaust-gas turbocharger 14 is arranged in the second overall intake line 6b. In each case one charge-air cooler 15a, 15b is arranged in the associated overall intake line 6a, 6b downstream of each compressor 12b, 14b.

In the second overall intake line 6b, a second shut-off element 10 is arranged between the second compressor 14b and the second plenum 6b', said second shut-off element serving for the deactivation of the second compressor 14b during partial deactivation. When the second cylinder group is deactivated, the second compressor 14b is no longer driven by the associated second turbine 14a. The closure of the second shut-off element 10 prevents a delivery of charge air to the cylinders 1, 3 by the second compressor 14b and a delivery of charge air into the second compressor 14b by the first compressor 12b when the flap 9a is open.

A third shut-off element 11 is arranged in the second overall exhaust line 8b upstream of the second turbine 14a. The closure of the third shut-off element 11 during partial deactivation prevents exhaust gas that originates from the first cylinder group from being delivered or passing into the cylinders 1, 3 of the second group via the second overall exhaust line 8b.

The two turbines 12a, 14a are in the form of wastegate turbines 12, 14. A first bypass line 12a' branches off from the first overall exhaust line 8a upstream of the turbine 12a of the first exhaust-gas turbocharger 12, and opens into the exhaust-gas discharge system 8 again downstream of the first turbine 12a of the first exhaust-gas turbocharger 12. A second bypass line 14a' branches off from the second overall exhaust line 8b upstream of the second turbine 14a of the second exhaust-gas turbocharger 14, and opens into the exhaust-gas discharge system 8 again downstream of the second turbine 14a of the second exhaust-gas turbocharger 14. In each case one shut-off element 12a", 14a" is arranged in each bypass line 12a', 14a'.

The exhaust-gas turbochargers 12, 14 are in each case equipped with an electric machine (a first electric machine 12c and a second electric machine 14c) as auxiliary drives. Each auxiliary machine/drive 12c, 14c is connected in terms of drive to the shaft of the associated exhaust-gas turbocharger 12, 14 in order to additionally be able to make power available for the drive of the compressor 12b, 14b of the exhaust-gas turbocharger 12, 14 and output said power to the compressors 12b, 14b. The auxiliary drive 12c, 14c can be activated and operated as required.

For example, if, during partial deactivation, it is necessary to increase the charge pressure of those cylinders 2, 4 of the first group which remain operational, because the load of said cylinders 2, 4, which remain operational, of the internal combustion engine 13 increases as a result of partial deactivation, increased drive power is required. The relevant charge pressure downstream of the first compressor 12b can then be increased using the first auxiliary drive 12c.

If the compressor 14b of the second exhaust-gas turbocharger 14 is activated, in particular after an end of the partial deactivation, it is generally sought for the rotational speed of the shaft of the second exhaust-gas turbocharger 14 to be increased quickly, that is to say for the rotor both of the second turbine 14a and of the compressor 14b to be accelerated again quickly, in order that the second compressor 14b contributes to the generation of the charge pressure. The second auxiliary drive 14c can advantageously assist this.

The first and the second auxiliary drive 12c, 14c may basically also be utilized for improving the transient operating characteristics of the internal combustion engine 13.

The engine system may further include a control system. The control system may include a controller 112. The controller 112 is shown in FIG. 1 as a microcomputer, including microprocessor unit 99, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 13, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP. Additional temperature, pressure, oxygen concentration, and other sensors may be positioned in the intake system and/or exhaust system.

Storage medium read-only memory 106 can be programmed with computer readable data representing instructions executable by processor 99 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, the controller may receive feedback from one or more sensors to determine engine load and engine speed (such as feedback from MAF, MAP, and PIP sensors) and may then adjust respective actuators coupled to the first shut-off element 9a, the second shut-off element 10, and the third shut-off element 11 to adjust the positions of the shut-off elements. The controller may also activate/inactivate fuel injectors, spark plugs, or other elements of the deactivatable cylinders to activate/deactivate the cylinders.

Figure 2:
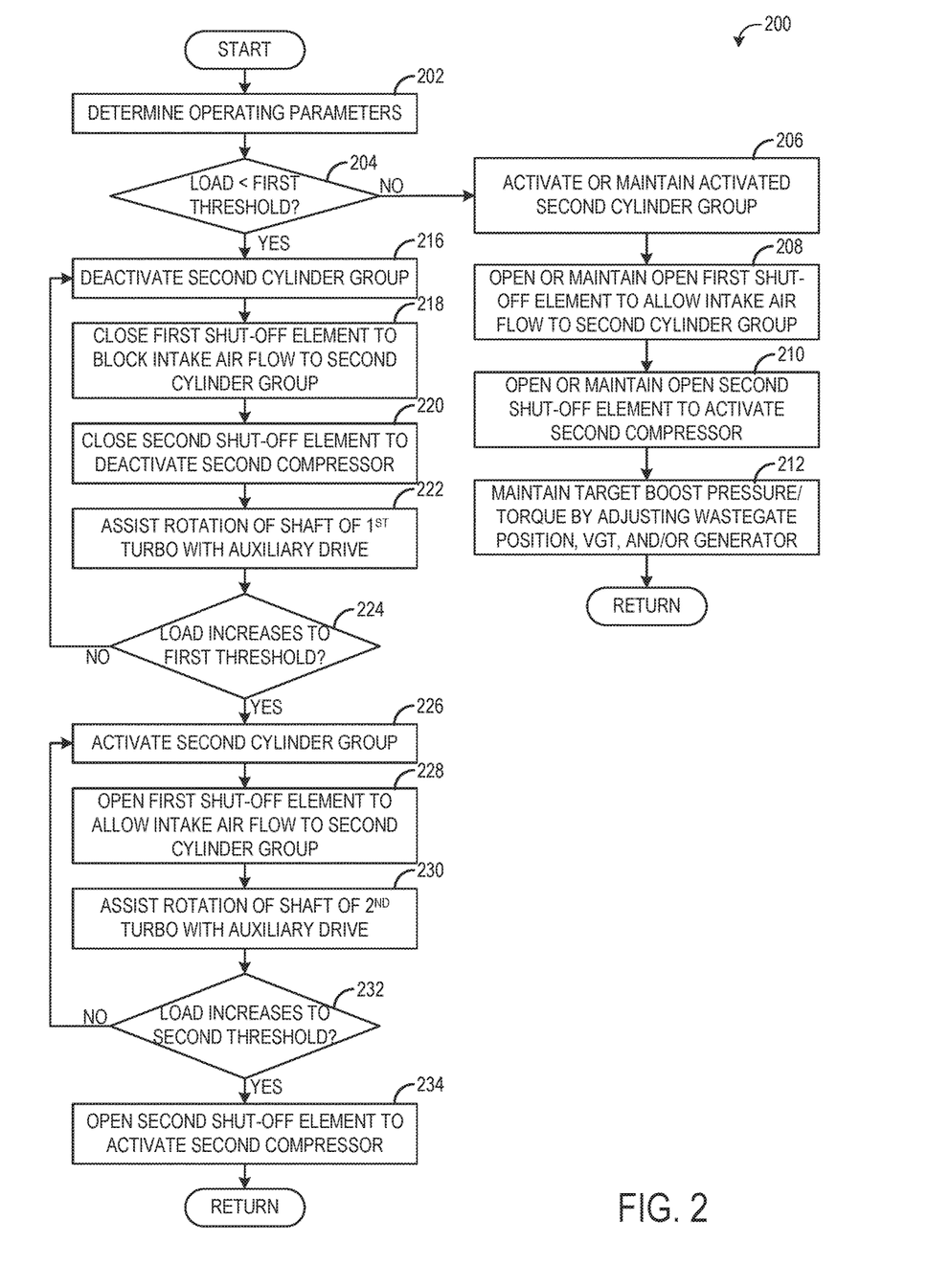
FIG. 2 is a flow chart illustrating a method for operating an engine.

FIG. 2 is a flow chart illustrating a method 200 for operating an engine, such as engine 13 of FIG. 1. Instructions for carrying out method 200 and the rest of the methods included herein may be executed by a controller (e.g., controller 112) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes determining operating parameters. The determined operating parameters may include engine speed, engine load, cylinder status (e.g., activated vs. inactivated), turbine speed, and other parameters. At 204, method 200 includes determining if engine load is below a first threshold load. In one example, the first threshold load may be $T_{up,1}$, as described above. In another example, the first threshold load may be another suitable load, such as 30% of maximum rated engine load, or other relatively low load. If engine load is not lower than the first threshold load, method 200 proceeds to 206 to activate or maintain activated the second cylinder group. Due to the mid-to-high engine load, combustion may be carried out in all the cylinders of the engine to meet the requested torque demand, and hence the second group of cylinders are activated (along with the first group of cylinders, which are activated during all engine operating conditions). The activated cylinders receive fuel via respective fuel supply mechanisms (e.g., fuel injectors) and the fuel air mix is combusted via respective ignition sources (e.g., spark plugs or compression). Further, each inlet opening is selectively opened via a respective inlet valve to admit charge air and each outlet opening is selectively opened via a respective outlet valve to expel exhaust gas.

At 208, method 200 includes opening or maintaining open the first shut-off element (e.g., element 9b of FIG. 1) to allow communication between the first intake manifold and second intake manifold. At 210, the second shut-off element (e.g., element 10 of FIG. 1) is opened or maintained open to activate (or maintain active) the second compressor. In this way, compression is provided by both the first compressor and the second compressor, and compressed intake air is provided to all the cylinders via the first intake manifold and second intake manifold. However, in some examples, the first shut-off element may be closed to block fluidic communication between the two intake manifolds. At 212, target boost pressure and/or torque is maintained by adjusting wastegate position, VGT position, and/or generator operation for each turbocharger. For example, to prevent overboost conditions, excess exhaust gas may be blown off via adjustment of the wastegate position of one or both of the turbines. In other examples, the VGT position of one or both of the turbines may be adjusted. Further, when the auxiliary drive includes a generator, one or both of the generators coupled to the turbines may be operated to convert excess exhaust energy to electrical energy, which may be stored in a battery or provided to other electric consumers. Method 200 then returns.

Returning to 204, if it is determined that the load is less than the first threshold, method 200 proceeds to 216 to deactivate the second cylinder group. When the load is below the first threshold, the cylinders of the second cylinder group are deactivated to increase the load on the activated cylinders of the first cylinder group, which may increase engine efficiency among other benefits. To deactivate the cylinders of the second cylinder group, fuel supply to the cylinders of the second cylinder group may be disabled, the ignition source of each cylinder of the second cylinder group may be disabled, and/or the inlet and/or outlet valves of each cylinder of the second cylinder group may be disabled (e.g., maintained closed).

At 218, the first shut-off element is closed to block intake air from flowing from the first intake manifold to the second intake manifold and then the second cylinder group. In this way, the first turbocharger supplies compressed air only to the first cylinder group via the first intake manifold, and no charge air is supplied to the cylinders of the second cylinder group. At 220, the second shut-off element is closed to deactivate the second compressor. In this way, intake air is only drawn in and compressed by the first compressor. At 222, method 200 optionally includes assisting rotation of the shaft of the first turbocharger via an auxiliary drive. For example, an electric motor may be activated to rotate the shaft of the first turbocharger along with the rotation provided by the first turbine. In another example, a mechanical coupling between the shaft of the first turbocharger and the crankshaft of the engine to rotate the shaft. In doing so, the first compressor may be driven at a faster speed than would be attainable by only rotation provided by the first turbine, thus rapidly providing the additional boost pressure for the increased load of the cylinders of the first cylinder group.

At 224, method 200 includes determining if the load has increased to the first threshold load. Once the load has increased to the first threshold, torque demand may not be met with only the first cylinder group, and hence power may be provided by all the cylinders. Accordingly, if the load has not reached the first threshold, the torque demand is sufficiently met with only the first cylinder group, and thus method 200 continues back to 216 to operate with the second group of cylinders deactivated. If the load has increased to or above the first threshold, method 200 proceeds to 226 to activate the second cylinder group, e.g., by activating fuel supply, ignition, and inlet/outlet valve actuation of the cylinders of the second cylinder group. At 228, the first shut-off element is opened to allow intake air to flow to the cylinders of the second cylinder group. However, only the first compressor is operated to supply compressed charge air to all the cylinders, and the second shut-off element remains closed. In this way, the torque drop that typically occurs during the transition from operation with part of the cylinders to operation with all of the cylinders may be reduced. At 230, method 200 optionally includes assisting rotation of the shaft of the second turbocharger with the auxiliary drive of the second turbocharger. In this way, the second turbocharger may be rapidly brought up to speed before the second compressor is activated. However, in some examples, activation of the auxiliary drive may be delayed until the second compressor is activated.

At 232, method 200 determines if the load has increased to a second threshold load. The second threshold load may be $T_{up,2}$, or the second threshold may another suitable load. The second threshold load may be higher than the first threshold load. For example, the second threshold load may be 40% of maximum rated engine load. If the engine load has not reached the second threshold, method 200 loops back to 226 and continues to operate with the second group of cylinders activated, the first shut-off element open, and the second shut-off element closed. If the load has reached or is above the second threshold, method 200 proceeds to 234 to open the second shut-off valve to activate the second compressor. Method 200 then returns.

Thus, according to embodiments disclosed herein, an engine includes a plurality of cylinders. The cylinders are arranged into two groups. A first cylinder group is configured to be operational during all engine operating conditions, while the second cylinder group is configured to be deactivated during certain operating conditions. By deactivating a portion of the cylinders, the remaining active cylinders (e.g., the cylinders of the first cylinder group) may be shifted into a higher-load operating region, which may be more efficient. In doing so, fuel economy may be increased. The engine may be turbocharged with a parallel turbocharger arrangement that includes a first turbocharger coupled to the first cylinder group and a second turbocharger coupled to the second cylinder group. The turbochargers may allow for requested torque to be delivered with a smaller displacement engine, further increasing fuel efficiency.

However, one issue that may arise during operation in the partial cylinder deactivation mode with a turbocharged engine is a torque drop that may occur upon reactivation of the deactivated cylinders. During operating in the partial cylinder deactivation mode, the second turbocharger that is coupled to the deactivated cylinders is not operational. Thus, when the deactivated cylinders are reactivated, the second turbocharger is also reactivated. However, following the reactivation, sufficient exhaust gas may not be produced by the cylinders to rapidly spin up the turbine of the previously-deactivated second turbocharger, thus resulting in a torque drop.

To minimize the torque drop that may occur upon reactivation of the deactivated cylinders, the engine system includes two separated intake manifolds fluidically connected via the first shut-off element, as well as the second and third shut-off elements, which allow for the isolation of the second turbocharger from the engine. As described above, reactivation of the second cylinder group may be performed responsive to engine load reaching a first threshold load. When the cylinders are initially reactivated, the first shut-off element is opened to allow compressed intake air from the compressor of the first turbocharger to flow to both the first cylinder group and the second cylinder group via both intake manifolds. However, during this period the second shut-off element remains closed to maintain the compressor of the second turbocharger in the deactivated state. The third shut-off element is opened so that exhaust gas from the second cylinder group is able to flow to the turbine of the second turbocharger, thus accelerating the turbine.

Once a second threshold load is reached that is higher than the first threshold load, the compressor of the second turbocharger may be activated by opening the second shut-off element. In other examples, the second shut-off valve may be opened responsive to a speed of the shaft of the second turbocharger reaching a threshold speed, or based on an alternative operating parameter that indicates the turbine is at a desired speed. Additionally or alternatively, the shaft of the second turbocharger may be accelerated prior to or along with activation of the compressor of the second turbocharger using an auxiliary drive, e.g., a mechanical coupling to the engine may be established or an electric motor may be activated.

When all cylinders are active, both the second shut-off element and the third shut-off element may be maintained open until a subsequent cylinder deactivation event occurs. However, the first shut-off element may be kept open, or it may be closed depending on operating conditions or desired engine operation. For example, during some conditions it may be desirable to operate the two intake manifolds at different pressures, and thus the shut-off element may be closed to prevent fluidic communication between the two manifolds. One example condition where it may be desired to operate the manifolds at different pressures is if an operator tip-in is predicted. In order to build boost to meet the increased torque demand that will occur upon the subsequent tip-in, one of the intake manifolds may be operated at increased pressure, e.g., by placing additional load on the turbine of the turbocharger associated with that manifold by operating the electric motor coupled to the turbine as a generator. Once the tip-in occurs, the first shut-off element may be opened to rapidly supply increased charge air to all the cylinders.

Another example operating condition where it may be desired to selectively open or close the first shut-off element is operation near a compressor surge line. For example, if the first shut-off element is closed and one of the compressors reaches operation near a surge line, the first shut-off element may be opened to transiently increase flow through the compressor.

Figure 3:
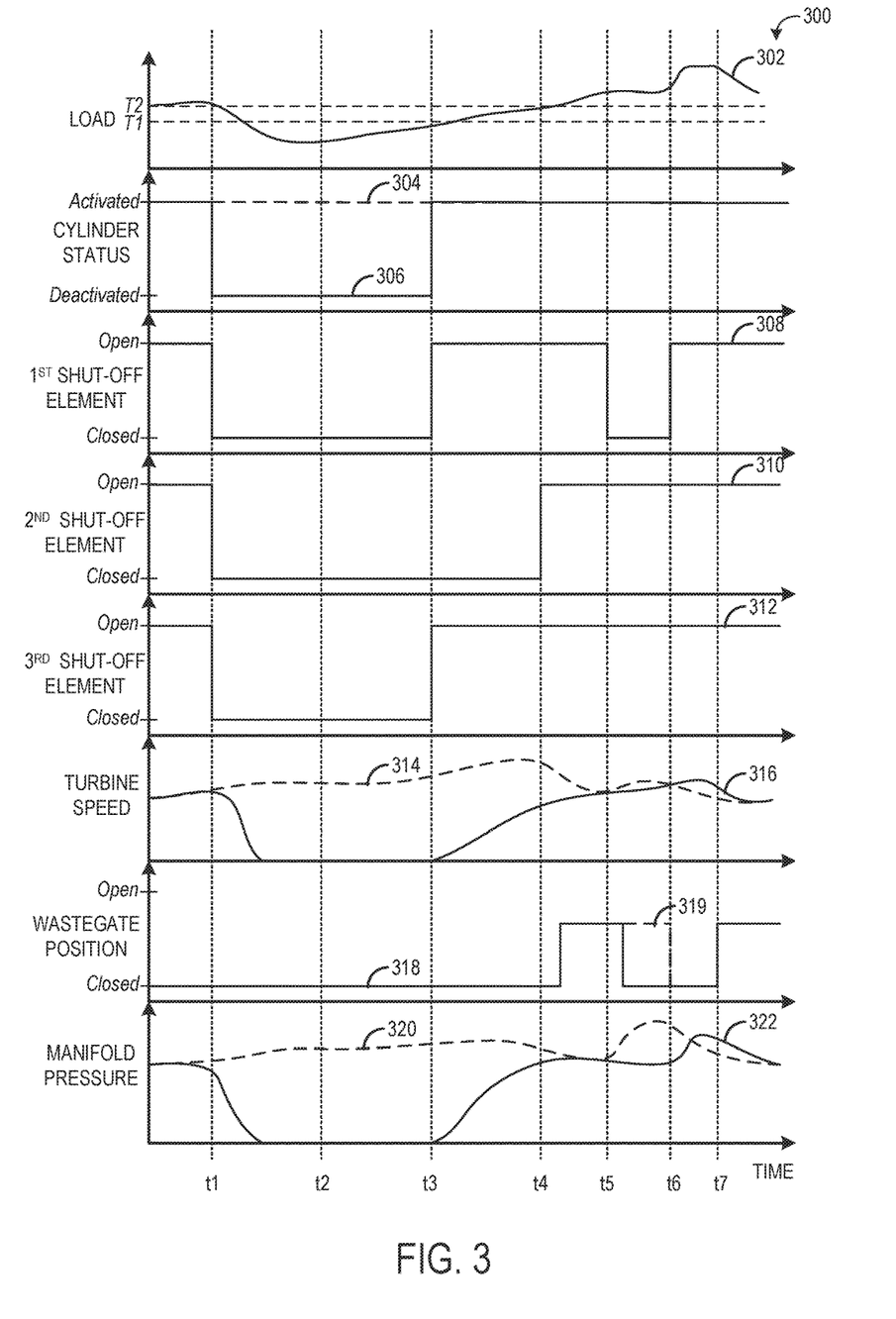
FIG. 3 is a diagram illustrating example operating parameters during the execution of the method of FIG. 2.

FIG. 3 is a diagram 300 showing operating parameters that may be observed during the execution of method 200. Diagram 300 includes a first plot depicting engine load, a second plot depicting cylinder status (activated vs. deactivated), a third plot depicting first shut-off element position, a fourth plot depicting second shut-off element position, a fifth plot depicting third shut-off element position, a sixth plot depicting turbine speed, a seventh plot depicting wastegate position, and an eighth plot depicting intake manifold pressure. For each plot, time is depicted along the horizontal, x-axis and values for each operating parameter are depicted along each respective vertical, y-axis.

Prior to time t1, engine load is in the mid-load range, and is greater than the threshold load (T1) for instituting cylinder deactivation, as shown by curve 302. Accordingly, the first cylinder group is active (as shown by curve 304) and the second cylinder group is active (as shown by curve 306). The first shut-off element is open, as shown by curve 308, allowing intake air to flow between the first and second intake manifolds, as pressure differences allow. However, as the second shut-off element is open (as shown by curve 310), intake air is able to flow to each intake manifold separately, and thus in some examples the first shut-off element may be closed prior to time t1. The third shut-off element is open, as shown by curve 312, allowing exhaust gas from the second cylinder group to flow to the second turbine of the second turbocharger. The turbine speed of each turbine is substantially equal, as shown by curves 314 (for the first turbine) and 316 (for the second turbine). Both wastegates may be closed, as shown by curves 318 and 319 (illustrating wastegate position for the first wastegate coupled across the first turbine and the second wastegate coupled across the second turbine, respectively), given that load is in the mid-load range. Intake manifold pressure for both manifolds is substantially equal, as shown by curves 320 and 322 (which illustrate pressure for the first intake manifold and second intake manifold, respectively).

At time t1, engine load drops below the first threshold T1. Responsive to engine load below the first threshold, the second cylinder group is deactivated. To prevent intake air from the first compressor and first intake manifold from flowing to the second intake manifold and ultimately the second group of cylinders, the first shut-off element is closed. Further, as compression by the second compressor is not indicated owing to the deactivated second group of cylinders, the second shut-off valve is closed, as well as the third shut-off element. Thus, the second turbocharger is isolated from the engine. As a result, the speed of the second turbine falls to a minimum turbine speed (e.g., zero), and the intake manifold pressure of the second intake manifold drops to a neutral/uncontrolled pressure, such as atmospheric pressure. In contrast, the speed of the first turbine increases upon deactivation of the second cylinder group, due to the increased load on the first cylinder group. Likewise, the intake manifold pressure of the first intake manifold also increases.

Engine load remains below the first threshold after time t1 and through time t2. Following time t2, engine load beings to increase. At time t3, engine load has increased to the first threshold T1, and hence the second group of cylinders is reactivated. The first shut-off element is opened at time t3 to allow intake air, compressed by the first compressor, to flow to the second group of cylinders via the second intake manifold. As a result, the pressure of the second intake manifold starts to increase. The third shut-off element is opened at time t3 to allow exhaust gas from the second cylinder group, now operational, to flow to the second turbine. However, the second shut-off element remains closed. In doing so, the second turbine may be accelerated, as appreciated by the turbine speed of the second turbine increasing following time t3, while the second compressor remains deactivated. Turbine speed of the first turbine and intake manifold pressure of the first intake manifold may each increase following time t3, due to the increased load placed on the first turbocharger as the first compressor supplies compressed intake air to all the cylinders.

Engine load continues to increase, and at time t4, the load reaches the second threshold T2. Responsive to the load reaching the second threshold, the second shut-off element is opened to activate the second compressor, and hence both compressors are operating to provide compressed charge air to all the cylinders. After time t4, the intake manifold pressures equalize, as do the turbine speeds. Throughout the engine operation from time t1-time t4, each wastegate remains closed, owing to the relatively low engine load and desire to accelerate the second turbine. However, following time t4, due to the higher engine load, the wastegates are each moved into a partially open position, and may be controlled to maintain desired boost pressure/intake manifold pressure for the respective intake manifolds.

At time t5, the first shut-off element is again closed, while the second shut-off element and third shut-off element remain open and all the cylinders are operational (e.g., all cylinders are combusting fuel). The first wastegate is also closed. Due to the separation of the intake manifolds and the closure of the first wastegate, the pressure of the first intake manifold begins to increase, as does the speed of the first turbine. The increased intake manifold pressure may act as a boost reserve to supply additional charge air in the event of a predicted subsequent tip-in, for example. Accordingly, at time t6, engine load rapidly increases due to operator tip-in. As a result, the first shut-off element is opened to supply the additional boost to the second intake manifold to assist in quickly meeting the increased torque demand, and the second wastegate is closed (the first wastegate remains closed). As a result, the pressure of the second intake manifold increases after time t6.

At time t7, the torque demand has been met and engine load begins to decrease following the tip-in. As a result, the wastegates are each moved back to the partially open position, and turbine speed and manifold pressures equalize and return to respective steady-state preset values.

An example provides a method including, responsive to a first condition, operating a first cylinder group of an engine, deactivating a second cylinder group of the engine, and blocking fluidic communication between a first intake manifold coupled to the first cylinder group and a second intake manifold coupled to the second cylinder group. The method includes, responsive to a second condition, activating the second cylinder group and establishing fluidic communication between the first and second intake manifolds. The fluidic communication between the intake manifolds may be blocked by closing a valve coupled between the intake manifolds (e.g., the first shut-off element discussed herein), and the fluidic communication may be established by opening the valve. The method may further include compressing intake air via a first compressor arranged in parallel with a second compressor. In an example, deactivating the second cylinder group includes blocking fluidic communication between the second compressor and the second intake manifold. The fluidic communication may be blocked by closing a valve coupled between the second compressor and the second cylinder group (e.g., the second shut-off element discussed herein). The method may further include, after the activating of the second cylinder group, establishing fluidic communication between the second compressor and the second intake manifold responsive to engine load increasing above a second predefinable load, e.g., by opening the second shut-off element.

In an example, the first condition includes engine load below a threshold load and the second condition comprises engine load increasing past the first threshold load. Establishing fluidic communication between the first intake manifold and the second intake manifold comprises opening a first shut-off element coupled between the first intake manifold and the second intake manifold, and establishing fluidic communication between the second compressor and the second intake manifold includes opening a second shut-off element arranged between the second compressor and the second intake manifold.

Another example provides a method including, responsive to a cylinder deactivation request, supplying compressed intake air to a first, operational cylinder of the engine via a first compressor driven by a first turbine, deactivating a second cylinder of an engine, and isolating a second turbine and a second compressor from the engine. The method includes, responsive to a cylinder reactivation request, reactivating the second cylinder, and prior to activating the second compressor, accelerating the second turbine via exhaust gas from the second cylinder. In an example, deactivating the second cylinder includes closing a first shut-off element coupled between the first compressor and the second cylinder. Isolating the second turbine and second compressor from the engine may include closing a second shut-off element coupled between the second compressor and the second cylinder and closing a third shut-off element coupled between the second cylinder and the second turbine. In an example, reactivating the second cylinder includes opening the first shut-off element, and accelerating the second turbine may include opening the third shut-off valve. The method may further include activating the second compressor by opening the second shut-off element.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    a supercharged internal combustion engine having at least two cylinders arranged into a first group and a second group, each cylinder having at least one outlet opening adjoined by a respective exhaust line for discharging exhaust gases via an exhaust-gas discharge system, each cylinder having at least one inlet opening adjoined by a respective intake line for supply of charge air via an intake system,
    each cylinder of the first group being operational even during partial deactivation of the internal combustion engine, and each cylinder of the second group being a load-dependently switchable cylinder,
    each exhaust line of each cylinder of the first group merging to form a first overall exhaust line, thus forming a first exhaust manifold, and each exhaust line of each cylinder of the second group merging to form a second overall exhaust line, thus forming a second exhaust manifold,
    each intake line of each cylinder of the first group merging to form a first overall intake line, thus forming a first intake manifold, and each intake line of each cylinder of the second group merging to form a second overall intake line, thus forming a second intake manifold;
    a first exhaust-gas turbocharger having a first turbine arranged in the exhaust-gas discharge system and a first compressor arranged in the intake system, the first turbine and the first compressor being arranged in on a first rotatable shaft;
    a second exhaust-gas turbocharger having a second turbine arranged in the exhaust-gas discharge system and a second compressor arranged in the intake system, the second turbine and the second compressor being arranged in on a second rotatable shaft;
    the first turbine arranged in the first overall exhaust line of the first group and the second turbine arranged in the second overall exhaust line of the second group,
    the first compressor arranged in the first overall intake line of the first group and the second compressor arranged in the second overall intake line of the second group, the first and second compressors arranged in parallel, and
    the first intake manifold of the first group and the second intake manifold of the second group connectable to one another via a connection, a first shut-off element being arranged in the connection, wherein a second shut-off element is arranged in the second overall intake line between the second compressor and the connection, wherein a third shut-off element is arranged in the second overall exhaust line, and wherein all of the shut-off elements are closed when a load of the supercharged internal combustion engine is less than a threshold.

2. The system as claimed in claim 1, wherein a first auxiliary drive is provided which is at least connectable in terms of drive to the first rotatable shaft of the first exhaust-gas turbocharger in order to additionally make power available for the drive of the first compressor of the first exhaust-gas turbocharger and output said power to the first compressor.

3. The system as claimed in claim 2, wherein a second auxiliary drive is provided which is at least connectable in terms of drive to the second rotatable shaft of the second exhaust-gas turbocharger in order to additionally make power available for the drive of the second compressor of the second exhaust-gas turbocharger and output said power to the second compressor.

4. The system as claimed in claim 3, wherein the first auxiliary drive and the second auxiliary drive are each a mechanically driven auxiliary drive.

5. The system as claimed in claim 3, wherein the first auxiliary drive and the second auxiliary drive are each an electrically driven electric machine.

6. The system as claimed in claim 5, wherein each electric machine is operable as a generator in order to receive power from an associated turbine.

7. The system as claimed in claim 1, wherein the first shut-off element is a flap.

8. The system as claimed in claim 1, further comprising a first bypass line which branches off from the exhaust-gas discharge system upstream of the first turbine and which opens into the exhaust-gas discharge system downstream of the first turbine, a first wastegate shut-off element being arranged in the first bypass line.

9. The system as claimed in claim 8, further comprising a second bypass line which branches off from the exhaust-gas discharge system upstream of the second turbine and which opens into the exhaust-gas discharge system downstream of the second turbine, a second wastegate shut-off element being arranged in the second bypass line.

10. The system as claimed in claim 1, wherein the first overall exhaust line and the second overall exhaust line merge, downstream of the first turbine and the second turbine, to form a common overall exhaust line.

11. The system as claimed in claim 1, further comprising one or more charge-air coolers arranged in the first overall intake line downstream of the first compressor and/or in the second overall intake line downstream of the second compressor.

12. The system as claimed in claim 1, wherein the engine includes four cylinders in an in-line arrangement, and wherein each of the first group and the second group includes one outer cylinder and one inner cylinder.

13. A method, comprising:
    responsive to a first condition, operating only a first cylinder group of an engine, compressing intake air supplied to the first cylinder group via a first compressor arranged in parallel with a second compressor, blocking fluidic communication between a first intake manifold coupled to the first cylinder group and a second intake manifold coupled to a second cylinder group, and blocking fluidic communication between the second compressor and the second intake manifold;
    responsive to a second condition, establishing fluidic communication between the first and second intake manifolds; and
    responsive to a third condition, establishing fluidic communication between the second compressor and the second intake manifold.

14. The method as claimed in claim 13, wherein the first condition comprises engine load below a first threshold load, the second condition comprises engine load between the first threshold load and a higher, second threshold load, and the third condition comprises engine load above the second threshold load, wherein establishing fluidic communication between the first intake manifold and the second intake manifold comprises opening a first shut-off element coupled between the first intake manifold and the second intake manifold, and wherein establishing fluidic communication between the second compressor and the second intake manifold comprises opening a second shut-off element arranged between the second compressor and the second intake manifold.

15. The method as claimed in claim 13, further comprising, responsive to the first condition, blocking fluidic communication between the second cylinder group and a turbine of the second compressor; and, responsive to the second condition, establishing fluidic communication between the second cylinder group and the turbine of the second compressor.

16. A method, comprising:
    responsive to a cylinder deactivation request, supplying compressed intake air to a first, operational cylinder of an engine via a first compressor driven by a first turbine, deactivating a second cylinder of the engine, and isolating a second turbine and a second compressor from the engine, wherein deactivating the second cylinder comprises closing a first shut-off element coupled between the first compressor and the second cylinder, and wherein isolating the second turbine and the second compressor from the engine comprises closing a second shut-off element coupled between the second compressor and the second cylinder and closing a third shut-off element coupled between the second cylinder and the second turbine; and
    responsive to a cylinder reactivation request, reactivating the second cylinder, and, prior to reactivating the second compressor, accelerating the second turbine via exhaust gas from the second cylinder.

17. The method of claim 16, wherein reactivating the second cylinder comprises opening the first shut-off element, wherein accelerating the second turbine comprises opening the third shut-off element, and wherein the method further comprises activating the second compressor by opening the second shut-off element after reactivating the second cylinder.

* * * * *